United States Patent [19]
Finnell

[11] 3,891,797
[45] June 24, 1975

[54] PLATING AREA MEASURING SYSTEM

[75] Inventor: Joseph C. Finnell, Fountain Valley, Calif.

[73] Assignee: McDonnell Douglas Corporation, Santa Monica, Calif.

[22] Filed: Dec. 26, 1973

[21] Appl. No.: 427,565

[52] U.S. Cl. .......... 178/6.8; 178/DIG. 36; 331/173; 356/178
[51] Int. Cl.² .................... G01B 19/58; H04N 7/18
[58] Field of Search......... 178/6.8, DIG. 36, DIG. 5; 331/173; 356/178

[56] References Cited
UNITED STATES PATENTS

| | | | |
|---|---|---|---|
| 2,674,915 | 4/1954 | Anderson | 178/DIG. 36 |
| 2,999,944 | 9/1961 | Laycak | 178/DIG. 36 |
| 3,081,379 | 3/1963 | Lemelson | 178/DIG. 36 |
| 3,280,253 | 10/1966 | McMaster | 178/DIG. 5 |
| 3,352,968 | 11/1967 | Walter | 178/DIG. 5 |
| 3,649,918 | 3/1972 | Freedman | 331/173 |

OTHER PUBLICATIONS
Transactions Institute Metal Finishing, Vol. 48, No. 2, Gill, R. W. A., "A Scanning Method for the Determination of Printed Wiring Area," pp. 68–71.

*Primary Examiner*—Howard W. Britton
*Attorney, Agent, or Firm*—D. N. Jeu; Walter J. Jason; Donald L. Royer

[57] ABSTRACT

A system capable of accurately and rapidly measuring irregular areas such as the aggregate plating surfaces of a printed circuit board or the minimum throat opening cross section of a fired rocket engine nozzle is disclosed. The system broadly and illustratively comprises a light source for illuminating a photographic negative (or positive) of the region under consideration, a television camera for viewing and scanning the illuminated negative, a calculator responsive to the video output signal of the camera and providing grouped digital signals representative of incremental portions of the irregular area being measured, and a counter for counting the digital signals and displaying the total count which is a direct measure of the irregular area.

7 Claims, 6 Drawing Figures

PATENTED JUN 24 1975

3,891,797

SHEET 1

PLATING AREA MEASURING SYSTEM

BACKGROUND OF THE INVENTION

My present invention pertains generally to the field of area measuring systems and, more particularly, to a printed circuit board plating area measuring system or the like.

In the manufacture of printed circuit boards, it is necessary to determine accurately the total area of aggregate plating surfaces characteristic to the particular design of any circuit board in order to electroplate it correctly. This information is needed to determine the proper electrical current setting to be used during the plating bath operation. A proper current setting can prevent costly rejections and this is an especially important consideration if precious metals (e.g., gold) are being used.

As is well known, one conventional method for determining aggregate plating area of a printed circuit board involves the use of a densitometer to read the circuit board photomaster (negative). The negative is backlighted and the densitometer includes a photocell which is exposed to light from the illuminated negative. The photocell output is used to drive a meter which thus provides an area readout equivalent to the amount of light transmitted by the photomaster. This amount of transmitted light can, of course, be easily related to that corresponding to a fully transmitting photomaster (i.e., a completely plated circuit board) which is normally rectangular and readily determinable in area. Other conventional methods for determining aggregate plating area include direct dimensional measurements (from a photomaster drawing) and associated calculations by an engineer, or the use of a planimeter which measures the areas to be plated by tracing the perimeters thereof.

Photoelectric densitometers are, however, inaccurate because, among other reasons, their light sources dim with age, light distribution is not constant, the light intensity at the photomaster edges is not equal to the intensity at the center, the photomaster film transparencies are inconsistent, photocells drift in their response due to temperature variation, and the readout is nonlinear (widens the necessary tolerance especially in the lower regions of readout). On the other hand, direct measurements and calculations by an engineer or use of a planimeter are both timeconsuming and of questionable accuracy, particularly since printed circuit boards also have numbers, letters and emblems that are normally plated and whose areas can only be estimated.

SUMMARY OF THE INVENTION

Briefly, and in general terms, my invention is preferably accomplished by providing a printed circuit board plating area measuring system including a light source for illuminating (backlighting) a photomaster negative (or positive with suitable front lighting), a television camera for viewing and scanning the backlighted negative to provide a unique video output signal characteristic to the negative design, calculator means responsive to video signal portions corresponding to plating area portions of the negative and providing grouped digital signals representative of incremental portions of the plating area being measured, and an electronic counter for counting the digital signals ad displaying the total count which is a direct measure of the aggregate plating area.

The calculator means broadly comprises a differential line driver having first, second and third inputs, a level detector for passing only the plating area portions of the video signal to the first driver input, an adjustable calibrate or exposure control means for providing a gating control signal or predetermined duration to the second driver input, and a high frequency square wave (pulse) oscillator having its output signal controllably provided to the third driver input, the gating control signal being also provided to the oscillator for restricting its output signal to the third driver input only for the duration of the gating control signal. The output signal of the line driver thus comprises high frequency digital (pulse) signals grouped according to the plating area portions of the video signal and limited to the duration of the gating control signal.

By using a negative photomaster (rather than a positive one) having a known calibrated area, the calibrate or exposure control means can be adjusted so that the duration of its gating control signal is set to produce a direct counter readout exactly in square inch value of the calibrated area of the negative. Since the system is linear, all subsequent counter readouts of unknown plating areas of other negatives are then represented accurately and directly in square inches without calculation. This permits a simpler operation for unskilled labor and all that the operator must do is to keep the decimal fixed relative to the calibrated reading.

BRIEF DESCRIPTION OF THE DRAWINGS

My invention will be more fully understood, and other advantages and features thereof will become apparent, from the following description of certain exemplary embodiments of the invention. The description is to be taken in conjunction with the accompanying drawings, in which.

DESCRIPTION OF THE PRESENT EMBODIMENTS

In the following description and accompanying drawings of certain illustrative embodiments of my invention, some specific values and types of components are disclosed. It is to be understood, of course, that such values and types of components are given as examples only and are not intended to limit the scope of the invention in any manner.

Figure 1:
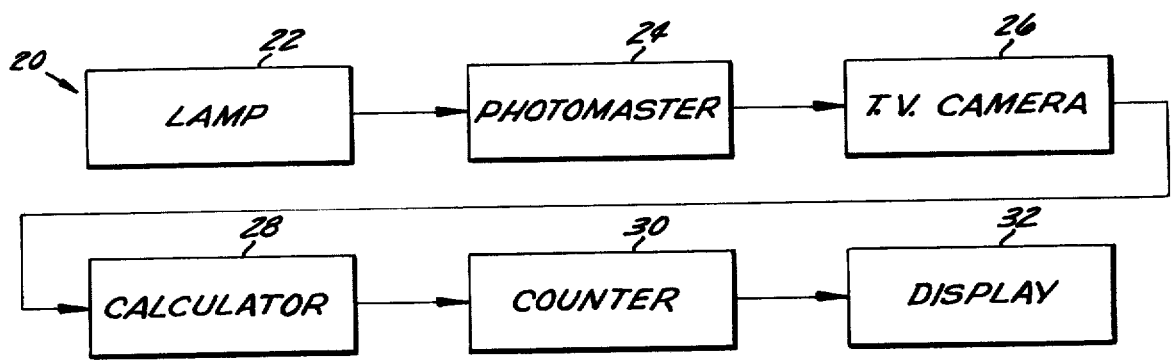
FIG. 1 is a broadly shown block diagram of a plating area measuring system according to this invention.

FIG. 1 is a block diagram of a plating area measuring system 20 according to this invention. The system 20 includes a lamp or light source 22, a suitably mounted photomaster negative 24 illuminated (back-lighted) by the light source, a conventional televison camera 26 for viewing and scanning the illuminated negative to provide a video output signal characteristic of the negative design, calculator means 28 for processing the video signal and producing high frequency digital signals arranged in groups corresponding in size (number of digital signals) to respective plating area portions of the negative, and an electronic counter 30 having a readout display 32 for counting the digital signals and displaying the total count over a predetermined duration or period and which count can be a direst measure of the aggregate plating area in the negative.

The photomaster negative 24 can be suitably mounted along its margins as any other photographic negative so that the full printed circuit area is adequately and properly illuminated by the light source 22. The margins of the negative 24 are, of course, opaque or masked by the mounting frame. While a photomaster positive with front lighting can be used, it was determined that a negative with back lighting was the most desirable since front lighting sometimes produces unwanted reflections from the surface of the photomaster. The television camera 26 is preferably a General Electric type TE-9 camera and the electronic counter 30 is preferably a Hewlett Packard type HP5245 counter, for example. This counter 30 includes a frequency measuring mode of operation and a count totalizing mode, and has a digital readout display 32. A television monitor (not shown) is used in conjunction with the camera 26 to allow correct positioning of the negative and assure proper viewing of the appropriate parts thereof.

Figure 2:
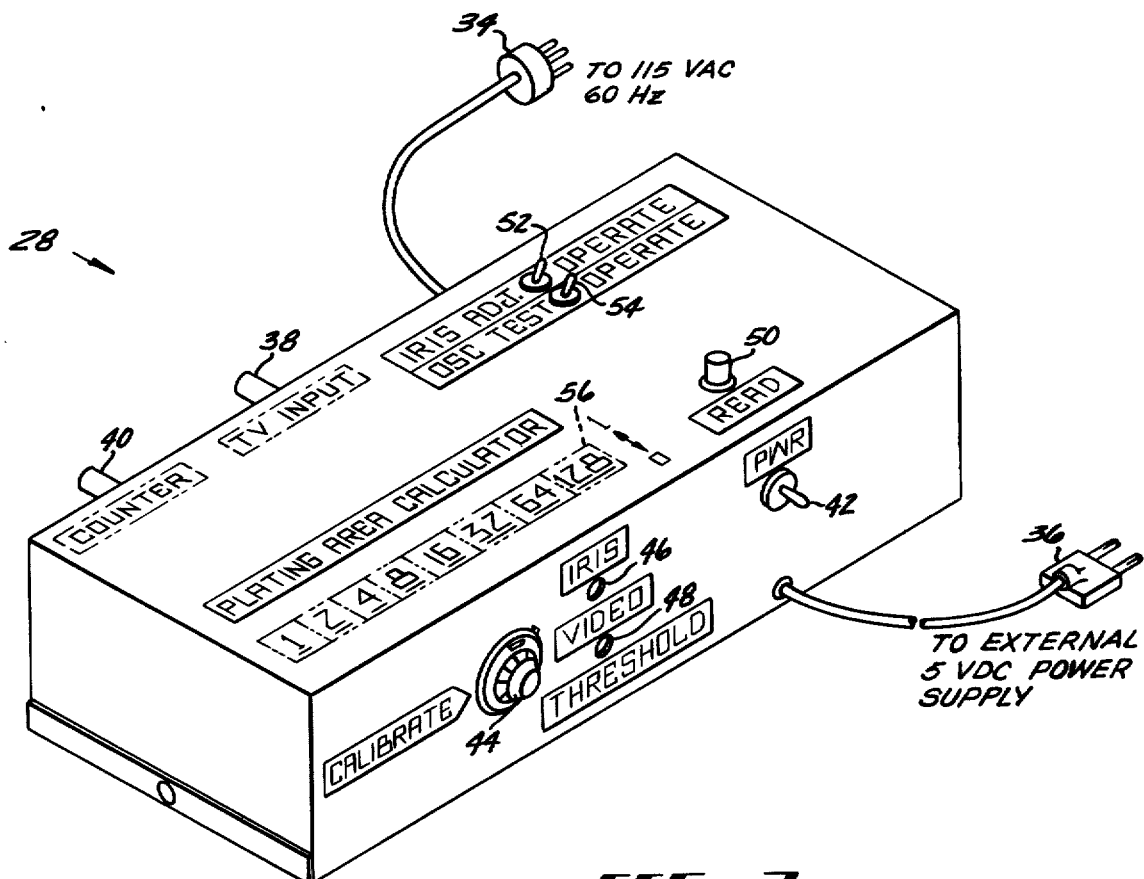
FIG. 2 is a frontal perspective view of a prototype embodiment of the calculator means used in the system of FIG. 1.

FIG. 2 is a frontal perspective view of a prototype embodiment of the calculator means 28. As illustrated, power cord 34 supplies 115 volts, 60 Hertz (Hz) power to the calculator means 28, and power cord 36 supplies 5 volts direct-current power thereto. The video output signal from the television cameral 26 (FIG. 1) is provided to the connector 38 labeled TV INPUT, and the output signal of the calculator means 28 is provided to the electronic counter 30 from the connector 40 labeled COUNTER. A power on-off switch 42 and a calibrate or exposure control adjustment potentiometer (knob) 44 are mounted on the front panel of the calculator means 28. Two small openings 46 and 48 in the front panel provide screwdriver access respectively to iris and video threshold adjustment potentiometer (screws) in the calculator means 28. Once adjusted, these potentiometers seldon require further adjustment.

A single pole, two position pushbutton switch 50 labeled READ is mounted on the top panel of the calculator means 28. Depressing and releasing the switch 50 will produce grouped digital signals from the calculator means 28 to counter 30 (FIG. 1) and provide a readout display. Two other single pole, two position switches 52 and 54 are also mounted on the top panel. The left position of switch 52 is labeled IRIS ADJ and its right position is labeled OPERATE. Similarly, the left position of switch 54 is labeled OSC TEST and its right position is labeled OPERATE. These switches 52 and 54 are kept in their right OPERATE positions during normal measuring operation of the calculator means 28.

The calibrate or exposure control potentiometer (knob) 44 is ordinarily used in conjunction with a calibration negative (one that provides a known plating area with dimensions traceable to the National Bureau of Standards). The potentiometer (knob) 44 is varied and the calculator means 28 operated to achieve a digital readout display from the coutner 30 of direct proportion with the known area of the calibration negative. The plating area of an unknown negative can then be read directly in the same units as the calibration negative, requiring the operator only to place the decimal and methematical calculation is not required. A group of eight single pole, two position, vertical sweep preset switches 56 is included in a modification or another embodiment of the calculator means 28.

Figure 3:
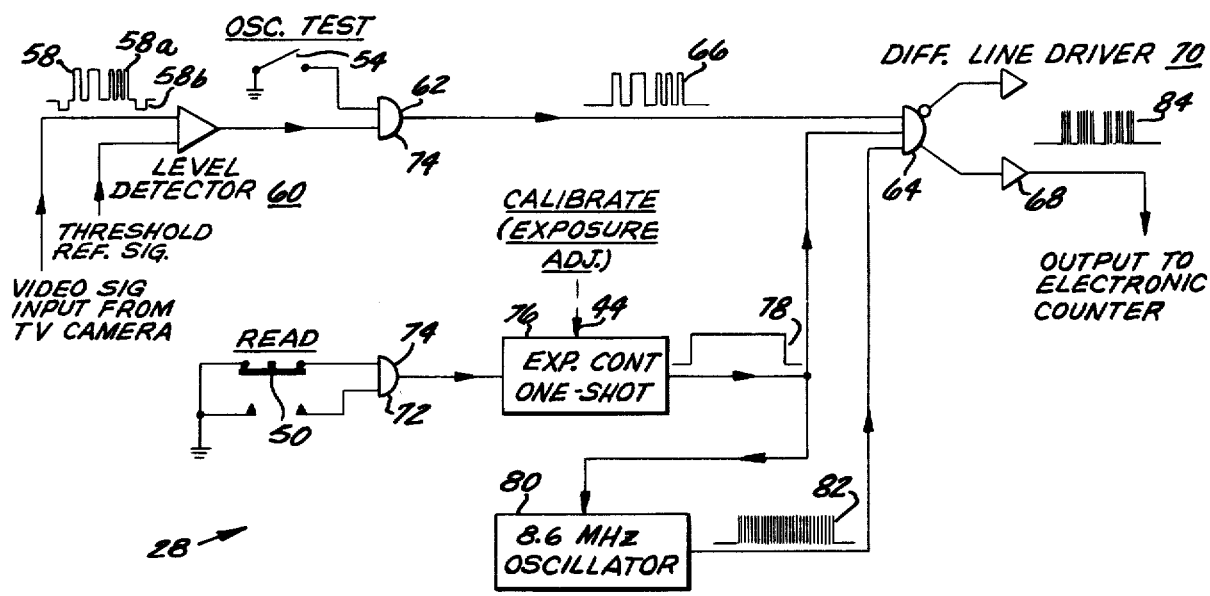
FIG 3 is a simplified block diagram of the calculator means used in the system shown in FIG. 1.

FIG. 3 is a block diagram, somewhat simplified, of the calculator means 28. When viewing a backlighted photomaster negative 24 (FIG. 1), the television camera 26 produces a video output signal characteristic of the negative design with either total white (transparent area) or total black (opaque area) definition. The negative, having very low levels of gray scale, provides a sharp contrast from black to white to black, and produces a video output signal from the camera 26 with accordingly sharp transitions. This video signal varies from, for example, approximately 0 volts for a black level input to approximately plus one +1 volt for a white level input, measured with respect to ground. A typical video signal 58 from the television camera 26 viewing a printed circuit board photomaster negative 24 is shown near one input of a level detector 60. This signal 58, as illustrated, represents one horizontal line of picture information and presents a generally square wave pattern including positive pulses 58a detailing only black and white image definition. The negative pulses 58b are, of course, the typical horizontal synchronizing (sych) pulses. The elapsed time for one complete horizontal line of sweep is 63.5 microseconds, for example.

The level detector 60 has a threshold reference signal of, for example, +0.1 vovlt applied volt its other input and is thus a white level sensor which passes only the positive pulses 58a representing picture information. The output signal from the detector 60 is applied to one input of a gate 62, the other input of which is connected to a normally open oscillator test switch 54. The output of the gate 62 is connected to a first input of an AND gate 64. The output signal 66 from the gate 62 is therefore applied to the first input of the gate 64. The output of the AND gate 64 is connected to amplifier 68 and the output of the amplifier is, in turn, connected to counter 30 (FIG. 1). The gate 64 and amplifier 68 can be components of a differential line driver 70.

The two position outputs of the read pushbutton switch 50 are connected to respective inputs of another gate 72. The gates 62 and 72 can be components of a single gate means 74. The output of the gate 72 governs the calibrate or exposure control means 76 which, in one embodiment of the calculator means 28, can be a one-shot multivibrator alone. The exposure control means 76 provides an output pulse signal 78 which can be varied in duration or length by manual (initial) adjustment of the calibrate potentiometer 44 (FIG. 2). The output signal 78 of exposure control means 76 is applied to the second input of the AND gate 64, and to a high frequency square wave (pulse) oscillator 80. The oscillator 80 can be triggered to run at, for example, 8.6 MHz and its output is connected to the third input of the gate 64.

The output signal 82 of oscillator 80 comprises a series of high freuquency pulses or digital signals which are controlled in appearance at the oscillator output according to the existance and duration of the gating signal 78 to the oscillator. Thus, the digital signal 82 applied to the third input of the AND gate 64 is effectively modulated by the output signal 66 from the gate 62. The output signal 84 of the amplifier 68 of line driver 70 therefore comprise a series of high frequency digital (square wave) signals arranged in groups corresponding in size to the widths of the pulses of the output signal 66. Of course, the pulses and their widths in the output signal 66 are established by the corresponding plating area portions of the video signal 58.

The electronic counter 30 (FIG. 1) is normally set to operate in its totalizing mode. When the groups of digital signals of output signal 84 are received by the counter 30, it accumulates the total number of digital signals for the time span allowed by the output signal 78 of the exposure control means 76 as applied to the second input of the AND gate 64. The totalized count accumulated by the counter 30 for the exposure duration is representative of the total "white" or plating area of the negative 24 viewed by the camera 26. The total count is given as a digital number in the readout display 32 of the counter 30. After recording the readout, the counter 30 can then be manually reset for the next reading. It may be noted that the oscillator 80 operating at 8.6 MHz provides a horizontal resolution approximately equivalent to the vertical for the usual 525-line television camera system. The horizontal resolution tolerance is adequate for all intended measurements. If, however, a camera system is used with more lines per frame and higher resolution is desired, it is necessary that the oscillator 80 provide a higher frequency than 8.6 MHz.

Figure 4:
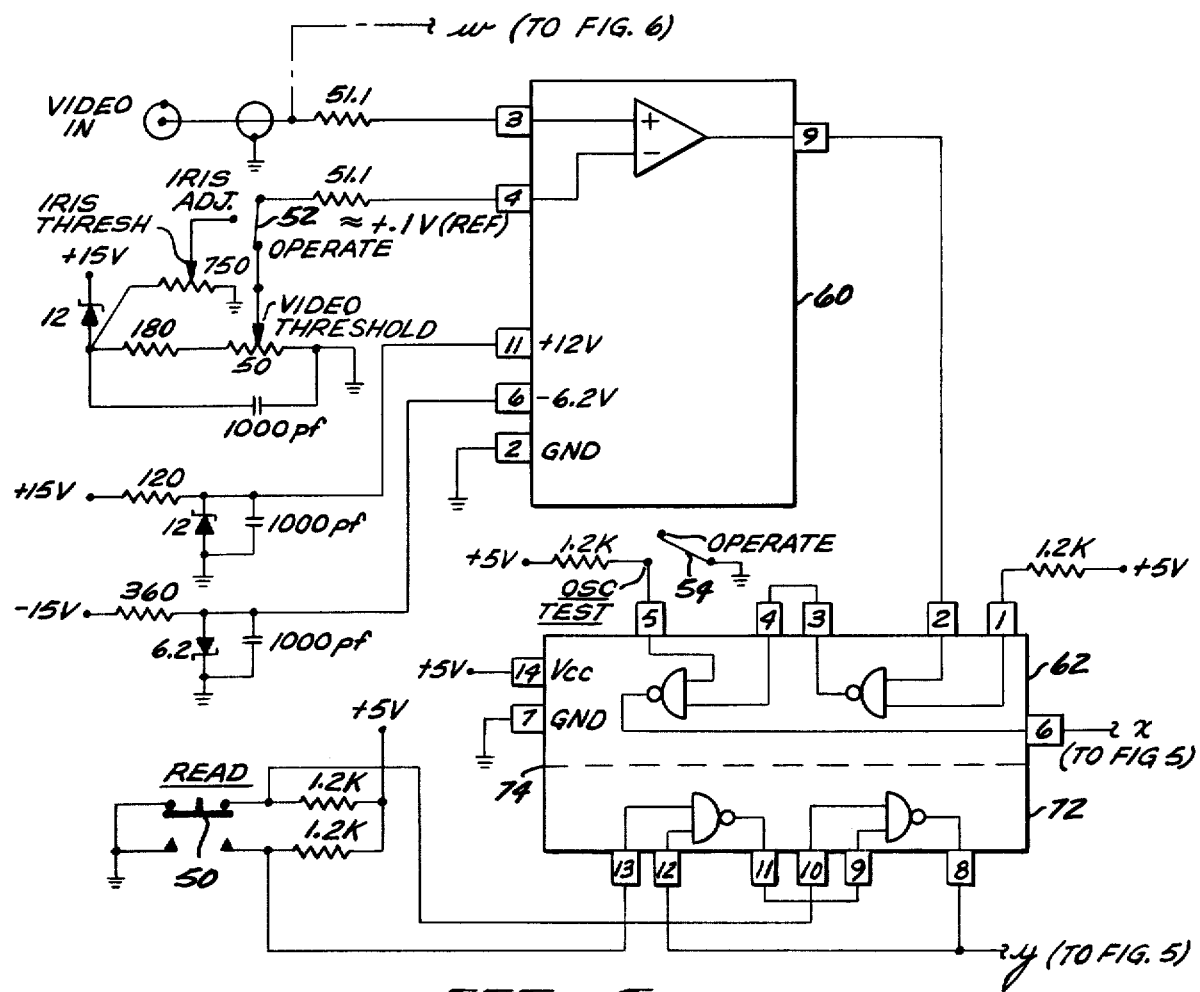
FIG. 4 is a circuit diagram illustrating the level detector, gate means, oscillator test switch and read switch shown broadly in FIG. 3.
Figure 5:
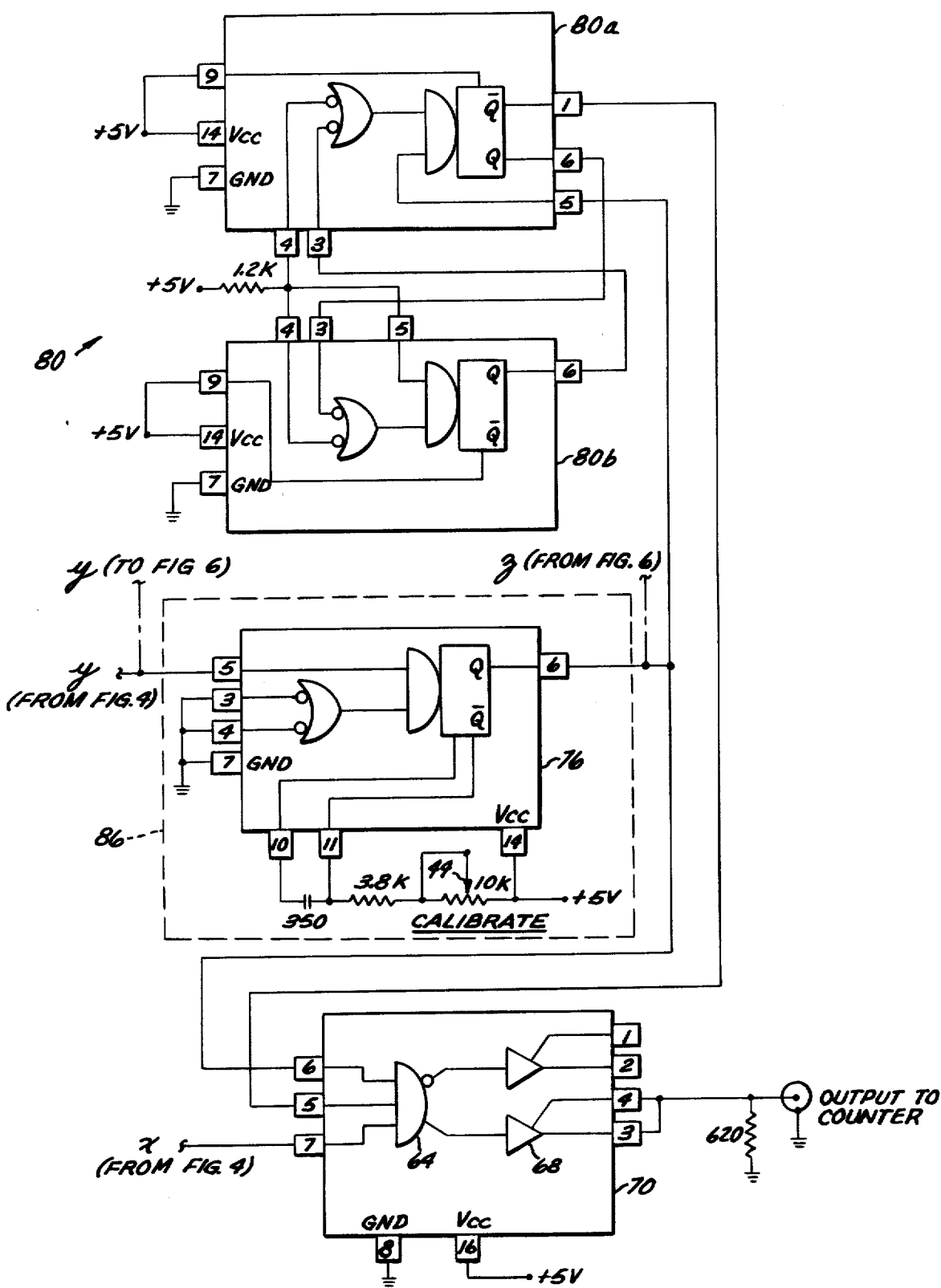
FIG. 5 is a circuit diagram showing the adjustable calibrate or exposure control means, high frequency oscillator and differential line driver of FIG. 3

FIGS. 4 and 5, taken together, comprise a circuit diagram of an exemplary first embodiment of the calculator means 28. Level detector 60 is a Fairchild Camera type uA710C comparator, gate means 74 is a Texas Instruments type SN7400 NAND gate, oscillator 80 includes two Texas Instruments type SN74121 ine-shots 80a and 80b connected to trigger each other, calibrate or exposure control means 76 is a Texas Instruments type SN74121 one-shot, and line driver 70 is a Fairchild Camera type 9614 differential line driver, for example. After warmup, the counter 30 (FIG. 1) is placed in its frequency measuring mode and the switch 54 of the calculator means 28 is placed in its "osc test" position so that the operation of the oscillator 80 can be first checked.

When the switch 54 is closed in the osc test position, a constant high signal 66 (one continuous pulse) is provided from pin 6 of gate 62 to pin 7 of line driver 70. Depressing and releasing the read pushbutton switch 50 produces a low pulse from pin 8 of gate 72 to pin 5 of the exposure control means 76. The control means 76 one-shot is reset and triggered by the low pulse (high to low to high signal) to produce from its pin 6 the gating control signal 78 which is applied to pin 5 of the one-shot 80a and pin 6 of line driver 70. The oscillator 80 is triggered and its output signal 82 (of high frequency pulses) is provided to pin 5 of the line driver 70. Since the output signal 66 from gate 62 is constant with switch 54 closed, the output signal from the line driver 70 is a continuous stream of digital signals for the duration of the gating control signal 78. The frequency of these digital signals is measured by the counter 30 and should be 8.6 ±0.3 MHz, for example. If so, the counter 30 can be placed back in its totalizing mode of operation.

For a camera 26 (FIG. 1) providing a vi... o signal "black" level of 0.0 volt (d-c) in the range of −0.0 to +0.08 volt and a "white" level of approximately +1.2 volts (d-c), switch 52 is placed in its "operate" position and the video threshold potentiometer adjusted to provide 0.11 ±0.01 volt input to pin 4 of comparator 60 as measured by a suitable voltmeter. This is the threshold reference signal for level detector 60. Then with the switch 52 in its "iris adj" position, the iris threshold potentiometer is adjusted to provide 0.8±0.1 volt input to the pin 4. In this condition, the lens iris of camera 26 is opened enough to produce a readout from the counter 30 when the read pushbutton switch 50 is operated. The switch 52 is returned to its operate position and, with a known calibration negative, the calibrate potentiometer 44 of exposure control means 76 is adjusted and read switch 50 operated until a suitable digital readout display is obtained on the counter 30. The digital readout is, of course, preferably adjusted to be in direct proportion with the known area of the calibration negative. The system 20 is thus ready to measure the aggregate plating area of unknown photomaster negatives.

Where the calibrate or exposure control means 76 is a one-shot multivibrator alone, the duration of its output signal 78 can be selected to be variable in an adjustment span from 0.9 to 3.3 seconds, for example. This time span will provide that a negative is always scanned a sufficient number of times during any selectable exposure period to ensure adequate accuracy in spite of any slight changes in duration of the output signal 78 that might occur after the exposure control means 76 has been set. The error band will, of course, average less for a greater number of frames scanned. If the repeatability in duration of the output signal 78 of the exposure control means 76 is +5 milliseconds for a given set adjustment thereof, this timing uncertainty results in a potential exposure error band of 0.7 percent based upon an exposure period of 1.463 seconds, for example.

This error band relates to approximately 0.3 frame out of a total of 44 for the period. In virtually all intended applications of the first embodiment of the measuring system 20, such accuracy is quite adequate. Where, however, an application requires a more accurate exposure control, the second embodiment of the system 20 (i.e., with the modified calculator means 28) including frame vertical sweep counting means and vernier exposure control can be used. In the second embodiment of the system 20, the calculator means 28 is modified to include the group of vertical sweep preset switches 56 (FIG. 2) and the calibrate of exposure control potentiometer (knob) 44 becomes that for a vernier one-shot multivibrator. The matter enclosed in dash lines 86 (FIG. 5) including the exposure control means 76 one-shot is deleted, and frame counting means with a vernier exposure control is added in lieu thereof to the circuit shown in FIGS. 4 and 5. This modified circuitry is used in the second embodiment of the measuring system 20.

Figure 6:
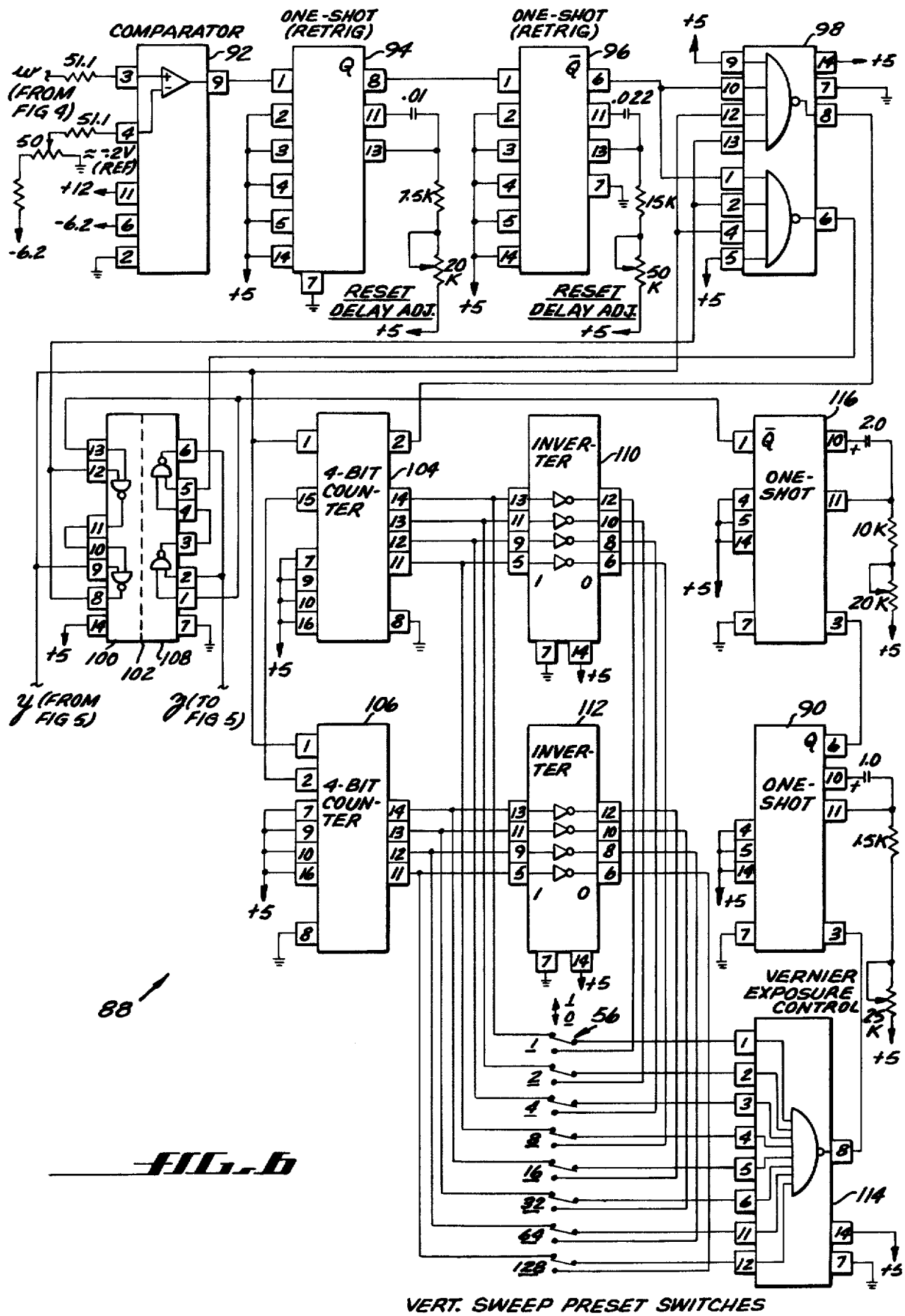
FIG. 6 is a circuit diagram of frame counting means including a vernier exposure control, which can be used in place of the calibrate or exposure control means shown in FIG. 5, to provide another calculator means embodiment that can be used in the system of FIG. 1.

FIG. 6 is a circuit diagram of suitable frame vertical sweep counting means 88 including a vernier exposure control means 90. The counting means 88 and its vernier means 90 are used in place of the exposure control means 76 one-shot shown in FIG. 5. The frame counting means 88 operate by detecting the equalizing and vertical sync pulses which occur during each vertical blanking interval of the standard television composite video signal. As is well known, the equalizing and vertical sync pulses comprise a series of negative pulses which occur at twice the frequency or rate of the horizontal sync pulses 58b (FIG. 3). A separate comparator 92 and two retriggerable oneshot multivibrators 94 and 96 can be used to detect and process these higher frequency pulses. The comparator 92 is a Fairchild Camera type uA710C differential comparator, and the one-shots 94 and 96 are Texas Instruments type SN74122 retriggerable monostable multivibrators, for example.

When the counting means 88 are used, the video output signal from the camera 26 (FIG. 1) is also applied to pin 3 of the comparator 92. A negative threshold reference signal of, for example, approximately −0.2 volt is adjusted on pin 4 so that the comparator 92 senses only the negative horizontal sync, equalizing and vertical sync pulses in the form of corresponding low pulses. That is, a negative input pulse corresponds to, for example, a +3 to 0 to +3 volts form of output signal from the comparator 92. Since the equalizing and vertical sync pulses occur at twice the rate of the horizontal sync pulses, the one-shots 94 and 96 can be used with suitable time constants to allow a reset of the former one-shot when only the horizontal sync pulses are present and of the latter during the equalizing and vertical sync pulse interval for an output pulse therefrom.

The period or time spacing between the horizontal sync pulses is H = 63.5 microseconds. The reset adjustment of one-shot 94 provides a delay at least greater than 0.5H but less than H. The reset delay of one-shot 94 can be illustratively set at 0.75H, for example. Similarly, the reset adjustment of one-shot 96 provides a delay at least greater than H but less than 9H (for the total leading equalizing pulses 3H interval, vertical sync pulses 3H interval and trailing equalizing pulses 3H interval). The reset delay of one-shot 96 can be set at 3H, for example. With these time settings, the one-shot 94 puts out a sustained signal exceeding the time constant of one-shot 96 when the series of equalizing and vertical sync pulses is present. This results in a single output pulse from pin 6 of one-shot 96 for each vertical blanking interval and, hence, each frame (single sweep). The output pulse from the one-shot 96 is applied to gate means 98 which is not enabled until a read signal has been provided by the pupshbutton switch 50. The gate means 98 is a Texas Instruments type SN7420 dual NAND gate, for example.

When the read pushbutton switch 50 (FIG. 4) is operated as before, the low output signal from pin 8 of gate 72 is provided on lead y to pins 4 and 12 of gate means 98 to disable its upper gate momentarily and prevent any gating of frame vertical sweep pulses during such time, to pin 9 of the left gate 100 of the gate means 102, and to the clear pins 1 of serially connected counters 104 and 106 which are thereby cleared to zero. The gate 100 accordingly produces a high signal from its pin 8 to the pins 2 and 13 of the gate meanas 98 to enable the same. A high signal from pin 6 of the gate means 98 is normally provided to pin 5 of the right gate 108 of the gate means 102. When pin 1 of gate 108 was previously in a low condition as during a prior cycle shut-down phase, pins 3 and 4 thereof are high so that its pin 6 is low with the pin 5 high.

After shut-down, pin 1 of gate 108 is normally high and its pin 5 goes low during the vertical blanking interval so that pin 6 becomes high to start area measurement from the beginning of a frame. Pine 2 of gate 108 is high with the pin 6 such that pins 3 and 4 go low and pin 6 remains high until the next shut-down phase occurs. This high enabling output signal from pin 6 of gate 108 appears on lead z which is connected to pin 5 of one-shot 80a (FIG. 5) and pin 6 of line driver 70. The output signals from pin 8 of gate 100 and pin 6 of gate 108 both remain high until a shut-down signal is received on pins 1 and 13 of the gate means 102. These high signals enable frame vertical sweep counting and passage by the line driver 70 of the modulated digital signals to counter 30 (FIG. 1).

When an output pulse from pin 6 of one-shot 96 is provided to pins 1 and 10 of gate means 98, low signals from pins 6 and 8 of gate means 98 are obtained and applied respectively to the already low pin 5 of gate 108 and to pin 2 of the counter 104 for a frame vertical sweep count. A high signal is consequently produced on pin 14 of such counter. This pin 14 is connected to pin 13 of inverter means 110 and to the upper contact of the "1" switch of group 56. The high signal is inverted by the inverter means 110 to provide a low signal on its pin 12 which is connected to the lower contact of the 1 switch. All of the output pins of the counters 104 and 106 are similarly connected to respective pins of the inverter means 110 and 112, and to respective upper contacts of the eight switches of the group 56. The output pins of the inverter means 110 and 112 are, of course, connected to respective lower contacts of the eight switches of group 56. The arms or poles of these eight switches are connected to respective inputs of NAND gate 114.

The serially connected counters 104 and 106 are 4-bit counters and can, therefore, count up to 256 (0 through 255). The carry signal is provided from pin 15 of counter 104 to pin 2 of counter 106. The eight vertical sweep preset switches of group 56 can also be set to any count to 256. For any particular frame vertical sweep count setting of the switches of group 56, the output of NAND gate 114 goes from a normally high to low signal when the conditions of the output pins of counters 104 and 106 match the preset switch conditions of group 56. This triggers the vernier exposure control one-shot means 90 which is adjustable to vary the duration or length of its output pulse that is applied to another one-shot 116.

The eight switches of group 56 permit up to 256 sweeps to be counted with a resolution of one sweep. The vernier control means 90 permit essentially infinite resolution if required. The one-shot 116 is triggered by the trailing edge of the output pulse of one-shot 90 and produces a low condition (shut-down) output pulse. The shut-down pulse from pin 1 of the one-shot 116 is of sufficient duration to exceed the length of any low pulse from pin 6 of gate means 98 to pin 5 of gate 108. The low shut-down pulse is applied to pins 1 and 13 of the gate means 102. This causes pin 8 of gate 100 to return to its normal low signal condition and disable the gate means 98, and pin 6 of gate 108 to go to a low signal condition and disable the line driver 70. The system is then ready for another cycle of operation.

The gate means 102 is a Texas Instruments type SN7400 NAND gate, the counters 104 and 106 are Texas Instruments type SN74161 synchronous counters, the inverter means 110 and 112 are Texas Instruments type SN7404 hex inverters, the NAND gate 114 is a Texas Instruments type SN7430 8-input NAND gate, and the one-shots 90 and 116 are Texas Instruments type SN74121 monostable multivibrators, for example.

It may be noted that there are 21 lines in the vertical blanking interval of each field, which do not contain any picture information and would produce a black area at the top of a reproduced picture. In a correctly adjusted receiver, if used, this black area is generally hidden behind the mask and is normally not seen by the viewer. In a similar manner, the camera 26 (FIG. 1) is preferably adjusted so that it views a part of the upper opaque or masked margin of the negative 24 to correspond with the black area.

While certain exemplary embodiments of this invention have been described above and shown in the accompanying drawings, it is to be understood that such embodiments are merely illustrative of, and not restrictive on, the broad invention and that I do not desire to be limited in my invention to the specific arrangements and constructions shown and described, for various modifications may occur to persons having ordinary skill in the art.

I claim:

1. An area mmasuring system comprising:
a facimile of a region including areas distinguishable into first and second general types by illumination;
means for illuminating said region;
means for viewing and scanning said illuminated region and producing a signal characteristic to said areas of said region;
means responsive to said characteristic signal and producing digital signals arranged in groups corresponding in size to respective portions of said first type of said areas, said grouped digital signal producing means being selectively operable for a predetermined duration; and
means for counting said grouped digital signals whereby a measurement of the aggregate area of said first type of said areas is obtained, said grouped digital signal producing means including an oscillator for generating a series of high rate digital signals, means for producing a control signal of predetermined duration, said control signal being applied to said oscillator to control output of said digital signals therefrom, and gate means responsive to those portions of said characteristic signal representative of portions of said first type of said areas to pass said digital signals in corresponding size groups to said counting means.

2. The invention as defined in claim 1 wherein said facimile includes a photographic negative, said viewing and scanning means includes a conventional closed circuit television camera, said characteristic signal is a video signal, and said control signal producing means comprises television vertical sweep counting means for establishing at least a major portion of said predetermined duration of said control signal.

3. The invention as defined in claim 2 wherein said television vertical sweep counting means includes means for detecting the equalizing and vertical synchronizing pulses for each vertical sweep from said video signal, and means for counting each vertical sweep occurrence of said pulses until a predetermined number of vertical sweeps is counted.

4. In an area measuring system in which a signal is produced characteristic of first and second types of areas in a region under consideration, grouped digital signal producing means comprising:
an oscillator for generating a series of high rate digital signals;
means for producing a control signal of predetermined duration, said control signal being applied to said oscillator to control output of said digital signals therefrom; and
gate means responsive to those portions of said characteristic signal representative of portions of said first type of areas to pass said digital signals in corresponding size groups therefrom.

5. The invention as defined in claim 4 wherein said control signal producing means includes an adjustable one-shot multivibrator.

6. The invention as defined in claim 4 wherein said characteristic signal is a television video signal, and said control signal producing means includes television vertical sweep counting means for establishing at least a major portion of said predetermined duration of said control signal.

7. The invention as defined in claim 6 wherein said television vertical sweep counting means comprises means for detecting the equalizing and vertical synchronizing pulses for each vertical sweep from said video signal, and means for counting each vertical sweep occurrence of said pulses until a predetermined number of vertical sweeps is counted.

* * * * *